United States Patent [19]
Kuniyoshi

[11] 3,749,991
[45] July 31, 1973

[54] BRUSHLESS ELECTRIC MOTOR WITH DAMPER WINDING
[75] Inventor: Masateru Kuniyoshi, Yokohama, Japan
[73] Assignee: Tokyo Shibaura Electric Co., Ltd., Kanagawa-Ken, Japan
[22] Filed: July 20, 1971
[21] Appl. No.: 164,402

[30] Foreign Application Priority Data
July 20, 1970  Japan.............................. 45/63130

[52] U.S. Cl.................. 318/254, 318/171, 318/175, 310/183
[51] Int. Cl. ........................................ H02k 29/00
[58] Field of Search..................... 318/171, 175, 138, 318/254, 439; 310/182, 183, 195, 196, 197

[56] References Cited
UNITED STATES PATENTS
| | | | |
|---|---|---|---|
| 1,262,774 | 4/1918 | Gilman | 310/183 |
| 1,082,532 | 12/1913 | Lamme | 310/183 |
| 2,340,669 | 2/1944 | Lange | 310/182 X |
| 3,483,458 | 12/1969 | Kirk | 318/254 |
| 3,106,654 | 10/1963 | Wesolowski | 310/183 |
| 3,529,220 | 9/1970 | Kobayashi et al. | 318/254 |
| 1,241,317 | 9/1917 | Whitaker | 318/254 |
| 2,844,748 | 7/1958 | Hutchings et al. | 310/183 |
| 2,872,605 | 2/1959 | Moore et al. | 310/183 |

Primary Examiner—G. R. Simmons
Attorney—Norman F. Oblon, Marvin J. Spivak et al.

[57] ABSTRACT

In a brushless electric motor, a static commutator including thyristors, and an angular position detector for detecting the relative angular position between an armature winding and a d.c. excited rotor are provided. The thyristors are turned on in sequence with a predetermined commutation lead angle by the signals transmitted from the angular position detector. A compensating winding is also provided in addition to a field winding and is wound on the rotor. A d.c. excitation current proportional to the armature current flows through the compensating winding to compensate the magnetomotive force resulting from the armature reaction.

4 Claims, 4 Drawing Figures

INVENTOR
MASATERU KUNIYOSHI

BRUSHLESS ELECTRIC MOTOR WITH DAMPER WINDING

BACKGROUND OF THE INVENTION

1. Field Of The Invention

The present invention relates generally to a brushless electric motor, and more particularly to a brushless electric motor in which a compensating winding is employed to compensate the magnetomotive force resulting from the armature reaction.

2. Description Of The Prior Art

Recently, brushless electric motors having running characteristics similar to those of conventional d.c. electric motors, but having no mechanical commutator have been developed. Such brushless motors have been found to have many advantageous features, such as easy maintenance, the possibility of high speed operation by elimination of the mechanical commutator, and easy speed control.

As is well known in the art, in a brushless motor it is necessary to provide an angular position detector or sensor, and a static commutator. The static commutator includes a plurality of controllable semiconductor elements, such as thyristors, and supplies an alternating current to the armature winding of the brushless electric motor. The angular position detector detects the relative angular position between the armature winding and the d.c. excited rotor, and transmits output signals to the thyristor gates of the static commutator, as the rotor of the brushless motor rotates, to cause the thyristors to turn on in a predetermined sequence.

It is also generally well known that a close relationship exists between the turn on time of the thyristors in the static commutator and the speed electromotive force, or back electromotive force which is induced in the armature winding by the magnetomotive force of the d.c. excited rotor during the rotation thereof. This relationship has been typically referred to as a commutation lead angle $\gamma$. The value of the commutation lead angle $\gamma$ is extremely important in determining the motor speed and the motor torque. Thus, the motor speed will increase in response to an increase in the commutation lead angle $\gamma$, and the torque thereof will decrease in response to an increase in the commutation lead angle $\gamma$.

Furthermore, the value of the commutation lead angle $\gamma$ is also extremely important in gate control of the thyristors in the static commutator. There are two generally known methods of thyristor commutation. One of the methods is forced commutation, and the other is natural commutation. The forced commutation method requires the use of a condenser unit for applying commutation currents to the thyristors of the static commutator and requires other switching means for periodically connecting the condenser unit to the thyristors. As a consequence the natural commutation method has been widely adopted recently.

Natural commutation uses the speed electromotive force, induced in the armature winding by the magnetomotive force of the d.c. excited rotor. Accordingly, the larger the commutation lead angle $\gamma$, the better the commutation performed, and if the commutation lead angle becomes negative the thyristors in the static commutator will not operate, resulting in a failure of commutation.

Thus there is a need to fix the commutation lead angle at a certain value. But it is well known that an armature reaction exists during the running operation of the motor. The armature reaction increases in response to an increase in the motor load, and thereby causes the speed electromotive force being induced in the armature winding to distort, and in turn causes the phase thereof to advance, and the commutation lead angle to be reduced. If the commutation lead angle is reduced, the commutation of the thyristors becomes undesirable. Consequently, in the past brushless electric motors could not be operated under heavy load conditions.

SUMMARY OF THE INVENTION

Accordingly, it is an object of the present invention to provide a new and improved brushless electric motor.

It is another object of the present invention to provide a new and improved brushless electric motor in which a static commutator performs smoothly even in the presence of armature reaction.

It is another object of the present invention to provide a new and improved brushless electric motor which can be operated under relatively heavy load conditions.

It is still another object of the present invention to provide a new and improved brushless electric motor in which both the motor speed and the motor torque are not influenced by load variation.

It is further an object of the present invention to provide a new and improved brushless electric motor in which the leakage inductance within the air gap is compensated.

Briefly, in accordance with the present invention, these and other objects are attained by the provision of a brushless electric motor which includes an armature having a polyphase armature winding and a d.c. excited rotor having magnetized pole members with a field winding thereon. A static commutator is also provided and is formed of thyristors for alternately applying armature current to the phase windings of the armature. An angular position detector is provided for detecting the relative angular relationship between the armature winding and the field winding, and the signals transmitted from the angluar position detector turn on the thyristors in sequence with a predetermined commutation lead angle. A compensating winding is wound on the rotor so as to generate a magnetomotive force by applying a d.c. excitation current thereto proportional to the armature current, thereby compensating the magnetomotive force resulting from the armature reaction.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
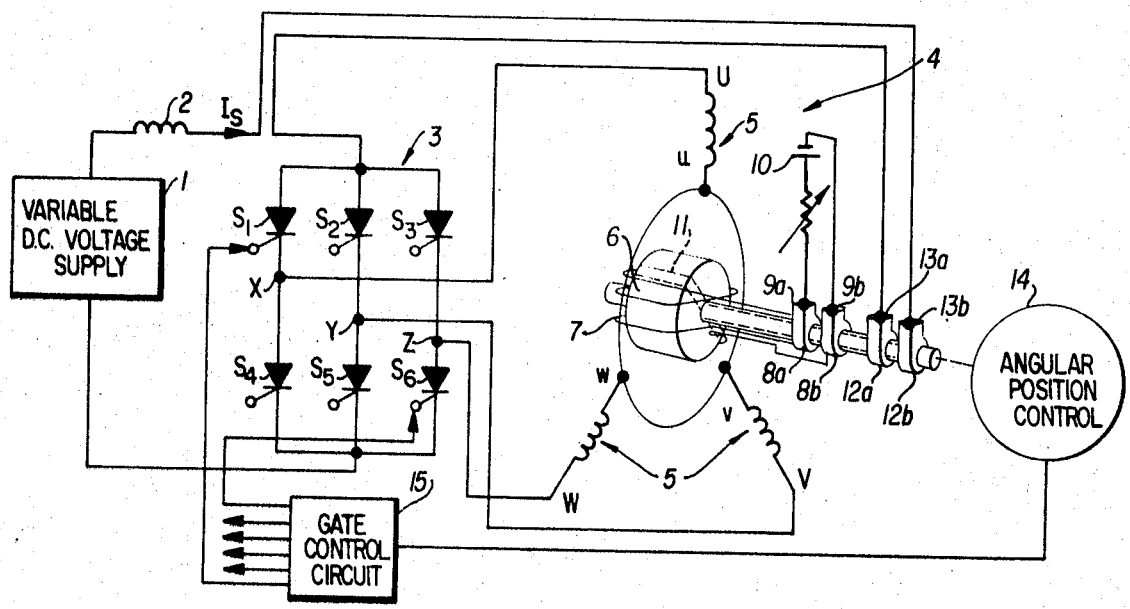
FIG. 1 is a schematic diagram and illustration of one embodiment of a brushless electric motor according to this invention.

Referring now to the drawings wherein like reference numerals designate identical or corresponding parts throughout the several views, and more particularly to FIG. 1 thereof, a revolving field type brushless electric motor 4 is illustrated. On a stator core of the motor 4 an armature winding 5 is wound in star connection. On a rotor 6 a main field winding 7 is wound, and is supplied a d.c. current from a d.c. voltage supply 10 through slip rings 8a and 8b, and brushes 9a and 9b. On the rotor 6, a compensating winding 11 is also wound and is connected between slip rings 12a and 12 b, which contact brushes 13a and 13b.

A variable d.c. voltage supply 1, including a chopper device or a Leonard device is provided. A smoothing reactor 2, the compensating winding 11 and a static commutator circuit 3 are connected in series with the voltage supply 1. The commutator circuit 3 in this embodiment includes six thyristors $S_1$ through $S_6$ connected in a three-phase bridge connection. The a.c. output terminals X, Y and Z of the commutator circuit 3 are connected to a u-phase, v-phase and w-phase windings of the armature winding 5.

A conventional angular position detector 14 is also provided and detects the relative angular position between the armature winding 5 and the field winding 7, and transmits the electrical signals corresponding to detected relative angular positions to a gate control circuit 15. The gate control circuit 15 operates to turn on the thyristors in sequence with a predetermined commutation lead angle.

Figure 2:
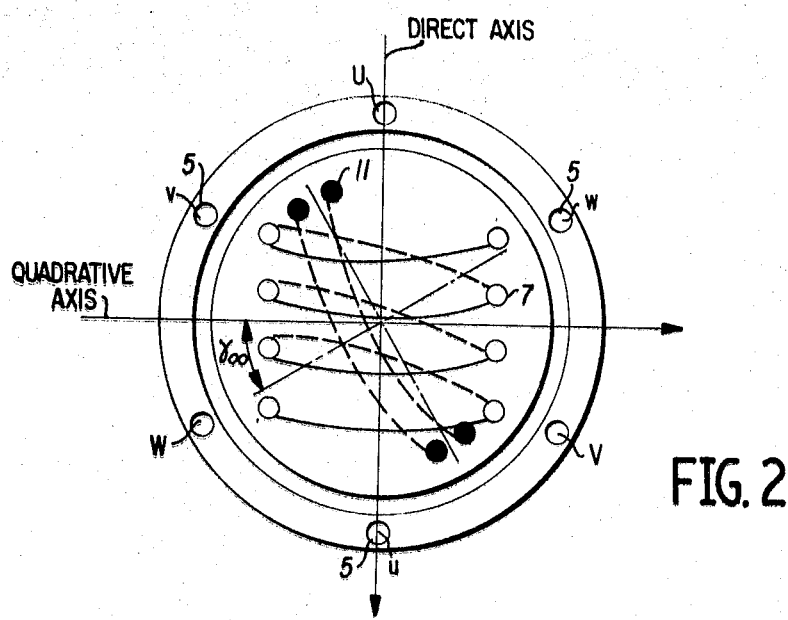
FIG. 2 is a cross-sectional view illustrating relative positions among an armature winding, a field winding and a compensating winding in one embodiment of a brushless electric motor according to this invention.

FIG. 2 illustrates the detailed disposition of the armature winding 5, the field winding 7 and the compensating winding 11 shown in FIG. 1. In FIG. 2, the field winding 7 is illustrated as wound so as to make two poles. The compensating winding 11 is wound so as to generate a magnetomotive force differing in direction from the quadrative axis by the predetermined commutation lead angle.

The operation of the brushless electric motor described above is as follows. The angular position detector 14 is adjusted to detect the relative angular position between the armature winding 5 and the d.c. excited rotor 6 so as to transmit a signal when the armature winding 5 is advanced to the quadrative axis of the d.c. excited rotor by an electrical angle $\gamma_0$ which is the predetermined commutation lead angle. The variable d.c. voltage supply 1 and the d.c. voltage supply 10 are switched on, and the gate control circuit 15 is excited. The angular position detector 14 detects the relative angular position, and transmits a signal to the gate control circuit 15, which emits gate signals to a given two of thyristors $S_1$ through $S_6$ to turn them on. Then current flows through two phase windings of the armature 5, so as to generate a magnetomotive force.

A magnetomotive force is also induced by the current flowing through the field winding 7, so a rotational torque is generated by the interaction between the two magnetomotive forces, and the rotor 6 begins to rotate. The angular position detector 14 sequentially detects the relative angular positions, and thyristors $S_1$ through $S_6$ are turned on in a predetermined sequence and at the desired instant of time as the motor rotates.

In the above operation, if the load increases, the armature current increases but the commutation lead angle is not reduced and is maintained at nearly the predetermined value $\gamma_0$ because of the existence of the compensating winding 11.

Figure 3:
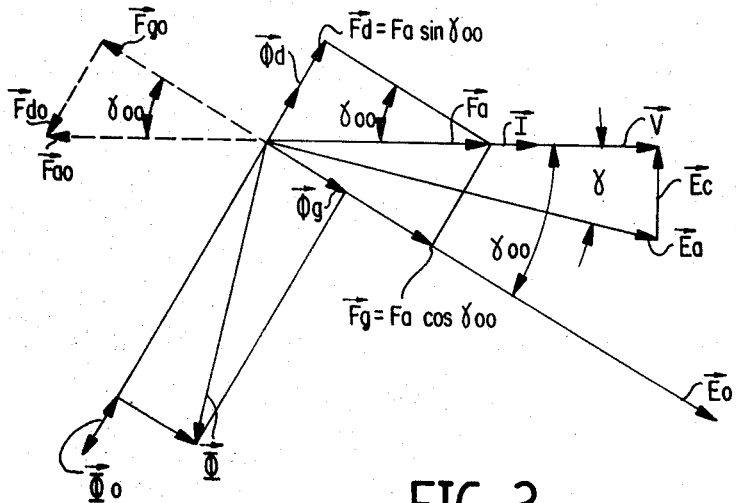
FIG. 3 is a vector diagram explaining the principle of this invention.

The principle of the operation of the above brushless electric motor is explained by the vector diagram of FIG. 3.

FIG. 3 shows the vector diagram of one phase of the armature winding 6 of the brushless electric motor. The vector diagram is drawn with a voltage $\vec{V}$ supplied to the armature winding as the reference. For simplifying the illustration, it is assumed that the armature current $\vec{I}$ is in phase with the voltage $\vec{V}$. The speed electromotive force $\vec{E}o$ induced in the armature is defined by the predetermined commutation lead angle $\gamma_o$, and thus lags by an angle $\gamma_o$ with respect to $\vec{V}$. $\vec{\Phi}_o$ is the magnetic flux induced by the field current so as to induce the induced voltage $\vec{E}o$, and lags by an angle of 90° with respect to $\vec{E}o$.

On the other hand, the armature reaction is generated due to the armature current $\vec{I}$. So the armature reaction magnetomotive force $\vec{F}_a$ is the same phase as the armature current $\vec{I}$. Then the vector $\vec{F}_a$ is divided into two vectors $\vec{F}_d$ and $\vec{F}_q$. The vector $\vec{F}_q$ is the same phase as the vector $\vec{E}_o$, and the vector $\vec{F}_d$ is opposite in phase with respect to the vector $\vec{\Phi}_o$. The magnetic fluxes $\vec{\phi}_d$ and $\vec{\phi}_q$ are induced by the armature reaction magnetomotive forces $\vec{F}_d$ and $\vec{F}_q$ respectively. The magnetic flux $\vec{\phi}_d$ reduces the field magnetic flux $\vec{\Phi}_o$, and the magnetic flux $\vec{\phi}_q$ deflects it. So, the actual flux $\vec{\Phi}$ inducing voltage in the armature is the total vector sum of the magnetic fluxes $\vec{\Phi}_o, \vec{\phi}_d$ and $\vec{\phi}_q$. Then the actual induced voltage which is measured between the ends of the armature winding 5 is shown as vector $\vec{E}_a$ which is advanced relative to the vector $\vec{\Phi}$ by 90°.

The commutation voltage used for the commutation of the thyristors in natural commutation is shown as the vector $\vec{E}_c$. It can easily be understood that it the load of the motor increases and the current $\vec{I}$ increases the vector $\vec{E}_c$ decreases, and the actual commutation lead angle $\gamma$ becomes negative.

But as beforementioned, the compensating winding 11 is wound so as to generate a magnetomotive force differing in direction from the quadrative axis by a predetermined commutation lead angle $\gamma_o$. This magnetomotive force is designated in FIG. 3 as a vector $\vec{F}_{ao}$. The magnetomotive force $\vec{F}_a$ due to the armature reaction is cancelled by the magnetomotive force $\vec{F}_{ao}$ due to the compensating winding. Furthermore, as the excitation current proportional to the armature current $\vec{I}$ flows in the compensating winding 11, the absolute values of vectors $\vec{F}_a$ and $\vec{F}_{ao}$ are always equal in spite of increasing load current. In other words, the armature reaction is entirely compensated by the magnetomotive force induced by the current flowing through the compensating winding 11, and the actual commutation lead angle $\gamma$ is thus fixed near $\gamma_o$ in spite of changing armature current. So the commutation of a static commutator is accomplished smoothly, and the motor can be operated even under heavy load conditions.

Figure 4:
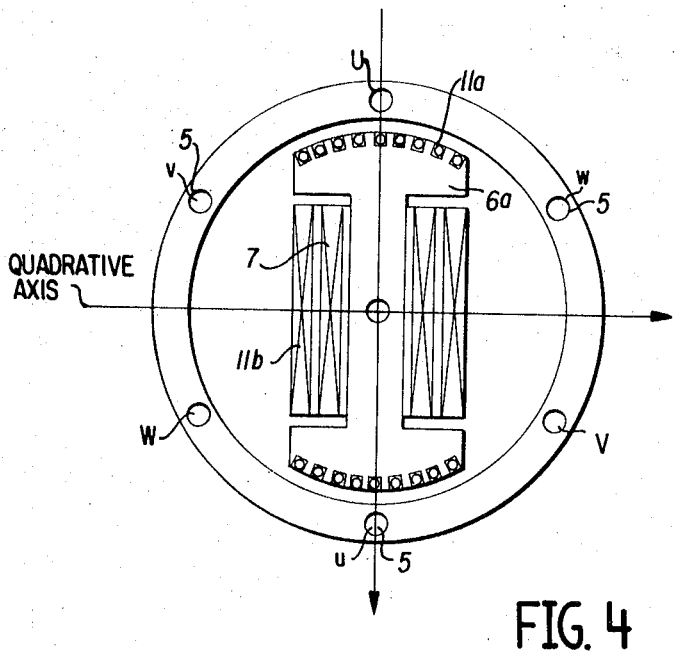
FIG. 4 is a cross-sectional view illustrating relative positions among an armature winding, a field winding and a compensating winding in another embodiment of a brushless electric motor according to this invention.

FIG. 4 is a view illustrating relative positions among the armature winding, the field winding and the compensating winding according to another embodiment of the brushless electric motor of this invention. In this embodiment, the compensating winding 11 is divided into two portions 11a and 11b as shown in FIG. 4. The compensating winding 11a is wound so as to generate a magnetomotive force at right angles to the direct axis, and the compensating winding 11b is wound so as to generate a magnetomotive force at right angles to the quadrative axis. The current flowing through the compensating winding 11a induces the magnetomotive force $\vec{F}_{qo}$ as shown in FIG. 3, and the current flowing through the compensating winding 11b induces the magnetomotive force $\vec{F}_{do}$ as shown in FIG. 3. The total sum of vectors $\vec{F}_{qo}$ and $\vec{F}_{do}$ becomes $\vec{F}_{ao}$, resulting in the same effect as described above. It can be easily understood that the currents flowing in the compensating windings 11a and 11b are the same and are proportional to the armature current.

Furthermore, it can be easily understood that if the magnetomotive force $\vec{F}_{do}$ induced by the compensating winding 11b is made a little larger than the direct axis magnetomotive force $\vec{F}_d$, the leakage inductance in the air gap is compensated.

It should now be apparent from the above that in accordance with the teachings of the present invention, the magnetomotive force due to the armature reaction can be compensated by the compensating winding 11. So the motor can be operated without failure of commutation even under overload conditions. Furthermore, the commutation lead angle of the static commutator can be fixed at a predetermined value even if the load current is varied.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. A brushless electric motor comprising:
    an armature having a polyphase armature winding;
    a static commutator including a plurality of thyristors for alternately applying armature current to said armature winding;
    a d.c. excited rotor having a field winding thereon;
    an angular position detector for detecting a relative angular position between said armature winding and said field winding;
    control means for turning on said thyristors in sequence and with a predetermined commutation lead angle, said control means employing signals transmitted from said angular position detector,
    a compensating winding on said rotor for generating a magnetomotive force to compensate the magnetomotive force resulting from armature reaction; and,
    means for connecting said compensating winding to a source of voltage not induced by said motor.

2. A brushless electric motor according to claim 1, wherein:
    said compensating winding is wound on said rotor for generating a magnetomotive force differing in direction from a quadrative axis by said predetermined lead angle.

3. A brushless electric motor comprising:
    an armature having a polyphase armature winding;
    a static commutator including a plurality of thyristors for alternately applying armature current to said armature winding;
    a d.c. excited rotor having a field winding thereon;
    an angular position detector for detecting a relative angular position between said armature winding and said field winding;
    control means for turning on said thyristors in sequence and with a predetermined commutation lead angle, said control means employing signals transmitted from said angular position detector; and,
    a compensating winding on said rotor for generating a magnetomotive force to compensate the magnetomotive force resulting from armature reaction, wherein said compensating winding is wound on said rotor in two parts and one of said parts is wound to generate a magnetomotive force at right angles with respect to a direct axis and said other part is wound to generate a magnetomotive force at right angles with respect to a quadrative axis, whereby, a d.c. excitation current proportional to said armature current flows through said compensating winding generating a magnetomotive force constituting the sum of said two magnetomotive forces generated by said two parts of said compensating winding and differing in direction from said quadrative axis by said predetermined commutation lead angle.

4. A brushless electric motor according to claim 3, wherein:
    said compensating winding is wound such that said magnetomotive force at right angles with respect to said quadrative axis is slightly larger than said magnetomotive force resulting from armature reaction.

* * * * *